United States Patent
Yoshizawa et al.

(10) Patent No.: US 7,650,131 B2
(45) Date of Patent: Jan. 19, 2010

(54) WIRELESS RECEIVER AND ITS DEMODULATING METHOD

(75) Inventors: Shingo Yoshizawa, Sapporo (JP);
Yoshikazu Miyanaga, Sapporo (JP);
Masaki Hirata, Yokohama (JP)

(73) Assignee: Semiconductor Technology Academic Research Center, Yokohama-shi (JP)

( * ) Notice: Subject to any disclaimer, the term of this patent is extended or adjusted under 35 U.S.C. 154(b) by 490 days.

(21) Appl. No.: 11/688,723

(22) Filed: Mar. 20, 2007

(65) Prior Publication Data

US 2007/0226289 A1    Sep. 27, 2007

(30) Foreign Application Priority Data

Mar. 22, 2006    (JP) ............................. 2006-079124

(51) Int. Cl.
*H04B 1/10* (2006.01)
*H04B 1/00* (2006.01)

(52) U.S. Cl. .................. 455/293; 455/309; 455/130

(58) Field of Classification Search .............. 455/293, 455/309, 312, 337, 130, 63.1, 67.13, 574, 455/277.2, 278.1, 296; 702/69, 71; 708/530
See application file for complete search history.

(56) References Cited

U.S. PATENT DOCUMENTS

| | | | |
|---|---|---|---|
| 6,611,795 B2 * | 8/2003 | Cooper ........................ | 702/191 |
| 6,898,198 B1 * | 5/2005 | Ryan et al. .................. | 370/338 |
| 7,411,935 B2 * | 8/2008 | Ryan et al. .................. | 370/338 |
| 7,496,130 B2 * | 2/2009 | Rumney ...................... | 375/146 |
| 7,564,893 B2 * | 7/2009 | O'Neill ....................... | 375/219 |

FOREIGN PATENT DOCUMENTS

| | | |
|---|---|---|
| JP | 2002-051016 | 2/2002 |
| JP | 2002-51016 A2 | 2/2002 |
| JP | 2004-056499 | 2/2004 |
| JP | 2005-341405 | 12/2005 |

* cited by examiner

*Primary Examiner*—Sonny Trinh
(74) *Attorney, Agent, or Firm*—Baker & Hostetler LLP

(57) ABSTRACT

A wireless receiver which is used for a digital signal transmission system to wirelessly transmit a digital signal by packetizing and modifying it, selectively sets the shortest arithmetical bit length satisfying a required communication quality when performs demodulation arithmetical processing to demodulate a digital signal to be packet-transmitted, inputs a demodulation arithmetical result by the arithmetical bit length to calculate an error vector magnitude value that is a measure indicating a difference between the arithmetical result and a known ideal result, predicts a bit error rate by using the EVM value as an evaluation criterion, selects an arithmetical bit length by which the bit error rate becomes optimum, and executes the demodulating arithmetical processing by the selected arithmetical bit length.

4 Claims, 5 Drawing Sheets

| | Ws(t) Apply to data symbol | W(t+1) Bit length of next packet |
|---|---|---|
| EVM<0.25 | W(t) | W(t)−1 |
| 0.25<EVM<0.27 | W(t) | W(t) |
| 0.27<EVM<0.29 | W(t)+1 | W(t)+1 |
| EVM>0.29 | Wmax | W(t)+1 |
F I G. 5
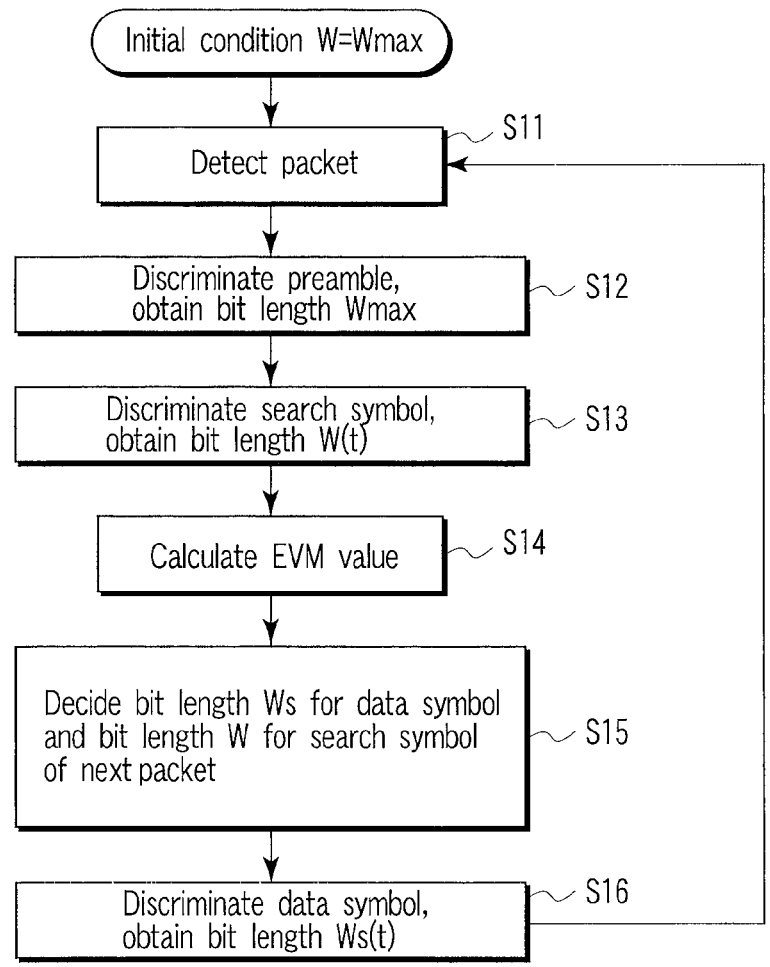
F I G. 6

| C/N (dB) | Bit length |
|---|---|
| C/N ≥ 24 | 5 |
| 13 ≤ C/N ≤ 24 | 6 |
| C/N ≤ 13 | 10 |

WIRELESS RECEIVER AND ITS DEMODULATING METHOD

CROSS-REFERENCE TO RELATED APPLICATIONS

This application is based upon and claims the benefit of priority from prior Japanese Patent Application No. 2006-079124, filed Mar. 22, 2006, the entire contents of which are incorporated herein by reference.

BACKGROUND OF THE INVENTION

1. Field of the Invention

The present invention relates to a wireless receiver and its demodulating method which utilizes, for example, a wireless local area network (LAN), and more specifically, relates to a technique which reduces power consumption at a demodulating circuit used for a processing device of a digital signal.

2. Description of the Related Art

The wireless receiver is driven by a battery for giving weight to its portability. Therefore, especially, in the processing device of the digital signal, the reduction in the power consumption in the demodulating circuit is desired.

A concrete configuration of a conventional technique is disclosed by Jpn. Pat. Appln. KOKAI Publication No. 2002-051016 is disclosed so as to satisfy this desire. The wireless receiver described in the aforementioned patent document enables changing an arithmetical bit length of digital signal processing and demodulates a digitized receiving signal by an instructed arithmetical bit length. The wireless receiver estimates a communication line situation from the demodulation result, and obtains the shortest arithmetical bit length satisfying a required communication quality on the basis of the estimation result to instruct the bit length to demodulating processing.

By the way, the configuration disclosed by the foregoing patent document measures a carrier-to-noise ratio (CNR) from the preamble of the receiving signal, dramatically changes the arithmetical bit length of the digital signal processing by using a branch table of a CNR versus arithmetical bit length using the conditions satisfying the required quality created from a pre-simulation (additive white Gaussian noise [AWGN]), and then obtains the shortest arithmetical bit length satisfying the required communication quality. FIG. 7 illustrates an applying range of the shortest bit length satisfying a CNE versus bit error ratio (BER) characteristic (BER=$10^{-3}$) under an AWGN environment at each bit length. FIG. 8 illustrates a CNR versus bit-length branch table created on the basis of the CNR versus BER characteristic illustrated in FIG. 7.

However, the aforementioned method presumes that a propagation environment is in an ideal state, and it does not take a variation in an actual propagation environment. Therefore, especially, the environment having been causing multipath fading poses a problem that an error operation is caused because the relation between the CNE and the arithmetical bit length possible to satisfy an actual required quality does not coincide with the pre-created branch table and a bit error characteristic is degraded.

BRIEF SUMMARY OF THE INVENTION

An object of the present invention is to provide a wireless receiver and its demodulating method which can appropriately select an arithmetical bit length without being affected by a variation in propagation environment, thereby, can effectively decrease power consumption in demodulating processing.

According to the present invention, there is provided a wireless receiver which is used for a digital signal transmission system wirelessly transmitting a digital signal by packetizing and modulation it, and selectively sets the shortest arithmetical bit length satisfying a required communication quality in conducting demodulation arithmetic processing to demodulate the digital signal to be packet-transmitted, the wireless receiver comprises an error vector magnitude (EVM) calculation unit configured to calculate an EVM value that is a measure indicating the difference from a known ideal result by inputting a demodulation arithmetic result by the arithmetical bit length, and an arithmetical bit-length selection unit configured to predict a bit error rate by using the EVM value as an evaluation criterion and for selecting an arithmetical bit length by which the bit error rate becomes optimum, and performs the demodulation arithmetic processing by the selected arithmetical bit length.

In addition, according to the present invention, there is provided a demodulating method of the wireless receiver which is used for a digital signal transmission system wirelessly transmitting the digital signal by packetizing and modulation it, the demodulating method comprises demodulating the digital signal to be packetized and transmitted by the specified arithmetical bit length, calculating an EVM value that is a measure indicating the difference from a known ideal result by inputting a demodulating arithmetical result from the demodulating arithmetical result, selecting an arithmetical bit length by which the bit error rate becomes optimum, and specifying the selected arithmetical bit length into the demodulating.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is an exemplary view illustrating an example of a bit-length changing rule by using an EVR evaluation criterion;

FIG. 6 is an exemplary flowchart illustrating a flow of concrete processing in the case in which a bit-length changing method is achieved by software;

DETAILED DESCRIPTION OF THE INVENTION

Hereinafter, embodiments of the present invention will be described with reference to the drawings in detail.

Figure 1:
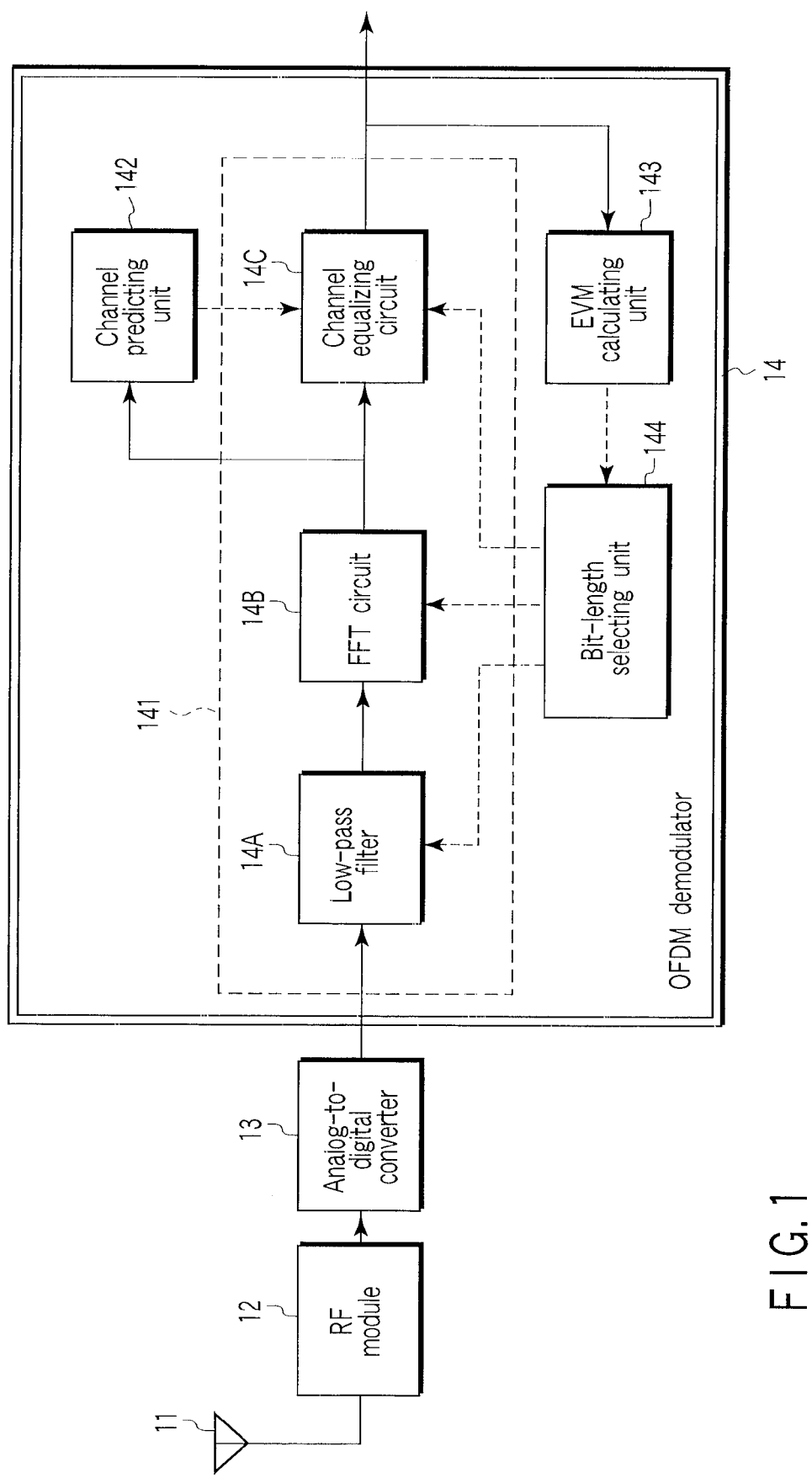
FIG. 1 is an exemplary block diagram illustrating a configuration in the case in which the present invention is applied to a wireless LAN receiver in a quatrature phase shift keying-orthogonal frequency division multiplex (QPSK-OFDM) system.

FIG. 1 is a block diagram depicting a configuration in the case in which the present invention is applied to a wireless LAN receiver in a quatrature phase shift keying-orthogonal frequency division multiplex (QPSK-OFDM) system represented by IEEE 802.11 a/g standard. In FIG. 1, a radio frequency (RF) signal received at a receiving antenna 11 is amplified by an RF module 12, and converted into a digital signal through an analog-to-digital converter 13 to be input in an OFDM modulator 14 after being converted into a baseband OFDM signal by orthogonal detection.

The OFDM modulator 14 includes a demodulator 141, a channel predicting unit 142, an error vector magnitude (EVM) calculating unit 143, and a bit length selecting unit 144.

After inputting the base-band OFDM signal input to the OFDM demodulator 14 to a low-pass filter 14A and removing unnecessary frequency components, the demodulating unit 141 conducts fast Fourier transform through an FFT circuit 14B to demultiplex the OFDM signal for each sub-carrier, and calculates backward amplitude-phase characteristics of transmission paths for each channel by a channel equalizing circuit 14C to restore it to an original transmission signal.

The channel predicting unit (arithmetical bit length fix) 142 predicts a defined channel by a prescribed frequency width for an FFT arithmetical result and the prediction result is transferred to the channel equalizing circuit 14C to be supplied to channel section processing.

The EVM calculating unit 143 calculates the EVM value to be an evaluation measure of arithmetical bit length selection for the transmission signal demodulated by the demodulator 141 (detailed will be mentioned later), and the EVM value calculated herein is sent to the bit length selecting unit 144.

The bit length selecting unit 144 predicts the BER by using the EVM value as the evaluation criterion to select the arithmetical bit length by which the BER becomes optimum, the selected arithmetical bit length herein is specified for the low-pass filter 14A, FET circuit 14B and channel equalizing circuit 14C of the demodulating unit 141.

In the foregoing configuration, the following will describe its processing contents.

At first, the wireless LAN receiver regarding the invention uses the evaluation criterion of the EVM for selecting the arithmetical bit length. The EVM is expressed by the following equation (1).

$$EVM = \sqrt{\frac{\sum_{k=1}^{M} |z(k) - R(k)|^2}{\sum_{k=1}^{M} |R(k)|^2}} \quad (1)$$

Wherein, z(k) is a channel-equalized QPSK demodulation signal (complex number with I, and Q components) generated form an EVM calculation symbol, R(k) is a known ideal signal (complex number with I, and Q components), and M is the number of OFDM sub-carriers. The calculation equation (1) is not limited to the case in which the transmission signal is the QPSK signal, and it goes the same as the case of a quadrature amplitude modulation (QAM) signal.

Figure 2:
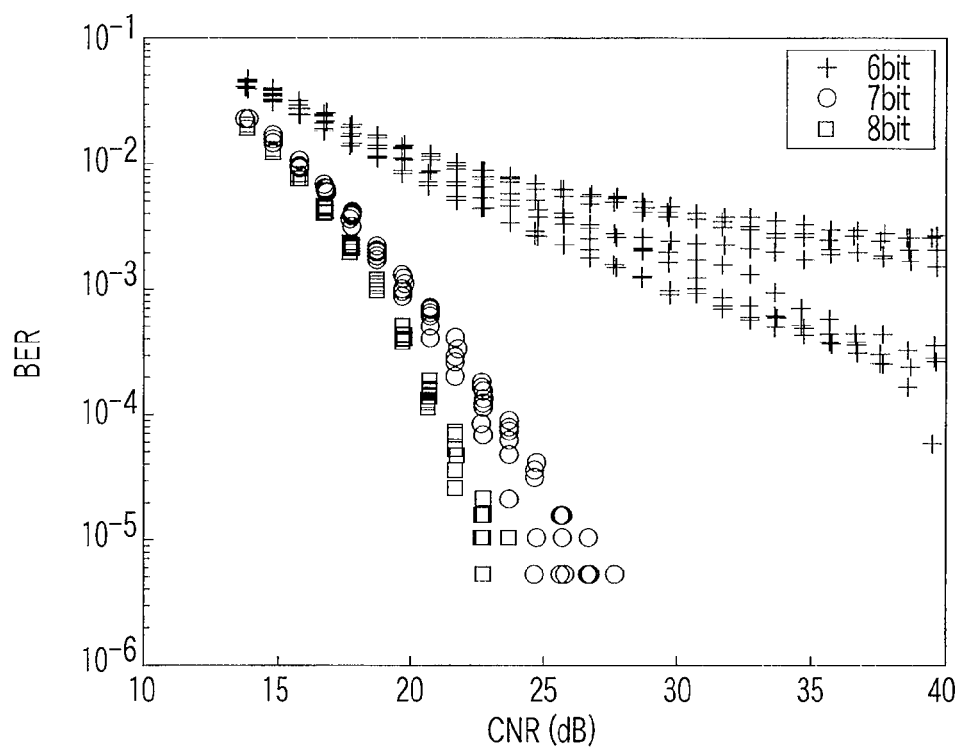
FIG. 2 is an exemplary view illustrating a CNR-BER characteristic measured from a QPSK-OFDM system receiver for each packet under a multipath fading environment.
Figure 3:
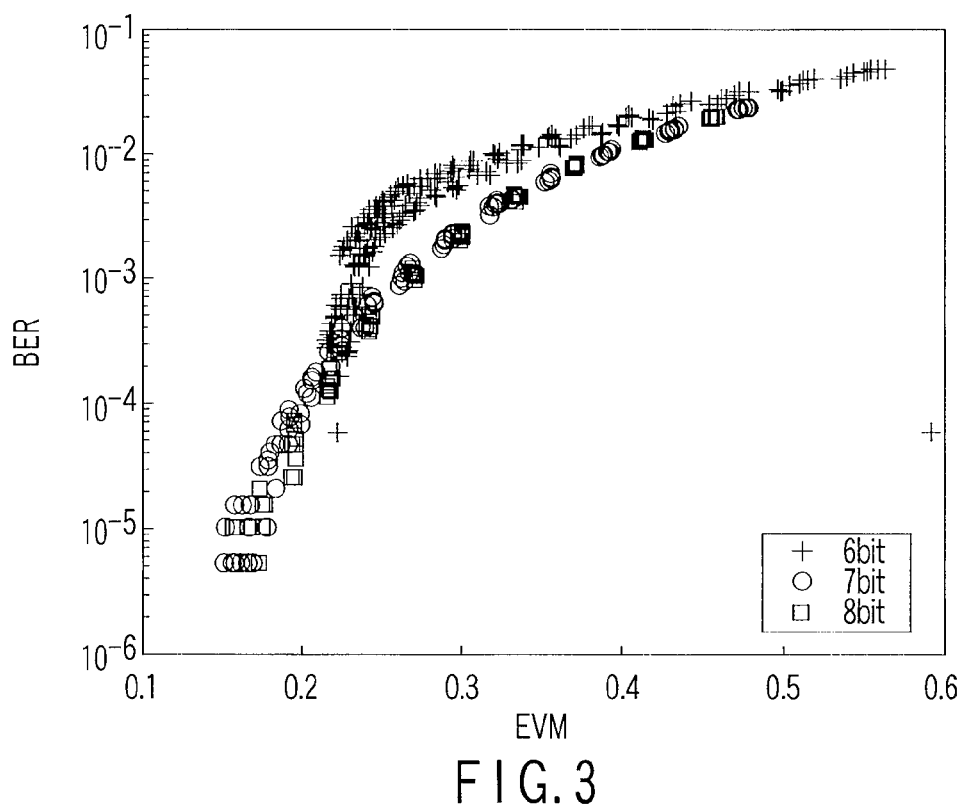
FIG. 3 is an exemplary view illustrating an EVM versus BER characteristic measured from the QPSK-OFDM system receiver for each packet under the multipath fading environment.

That is to say, the EVM is a measure to indicate the difference between an ideal waveform and a measured waveform, it is given by a distance between a receiving signal vector having the I and Q components of a demodulated output. FIG. 2 and FIG. 3 illustrate the CNR versus BER characteristic and the EVM versus BER characteristic in bit lengths (6, 7, and 8) measured for each packet from the QPSK-OFDM system receiver under the multipath fading environments (delay spread 50 ns and 18-wave independent Rayleigh fading model), respectively. The CNR versus BER characteristics, as shown in FIG. 2, are uneven for each bit length. Conversely, the EVR versus BER characteristics, as shown in FIG. 3, have less variations for each bit length, given almost in a relation of one to one, and even if the bit lengths are different from one another, the characteristics are excellent. Therefore, using the EVM as the evaluation criterion enables prediction of the BER with high reliability.

As mentioned above, the conventional wireless receiver disclosed by Jpn. Pat. Appln. KOKAI Publication No. 2002-051016 uses the CNR for predicting a communication situation, so that a problem is produced, wherein a large error occurs in the prediction result under the multipath fading environment, and error operations in changing bit lengths is caused to deteriorate a bit error characteristic. In contrast, the wireless LAN receiver using the EVM as the evaluation criterion calculates the EVM on the basis of the output signal from the demodulating unit 141 having arithmetical units 14A to 14C of variable bit lengths. The wireless receiver evaluates the arithmetical bit length by including the arithmetical error accompanied by multipath interference, or bit-length changes of the receiver other than noise components in a communication path. Like this, the EVM being calculated on the basis of the demodulation performance of the actual receiver, a change in bit length is possible with high accuracy.

Figure 4:
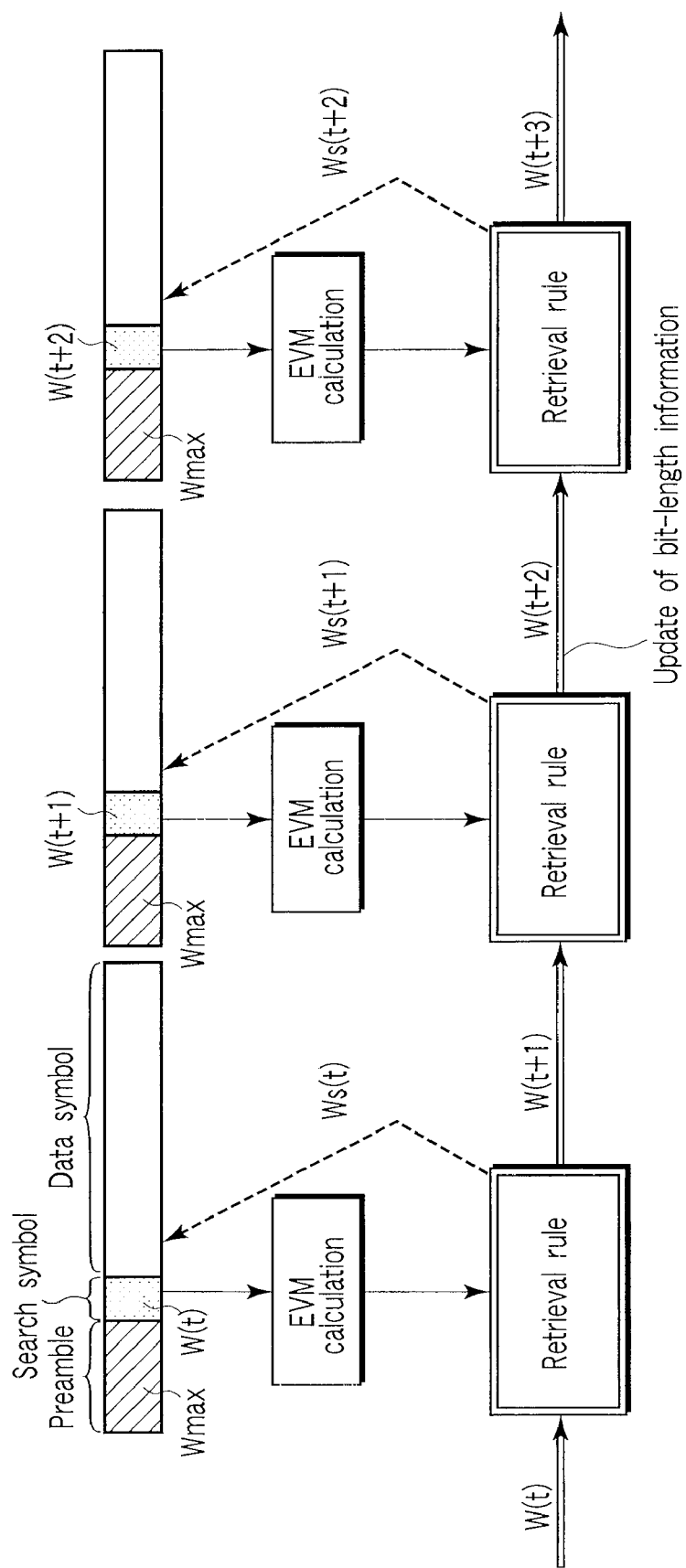
FIG. 4 is an exemplary schematic view illustrating an outline of a bit-length changing method by using an EVM as an evaluation criterion for a packet transmission OFDM system used for a wireless LAN.
Figures 7, 8:
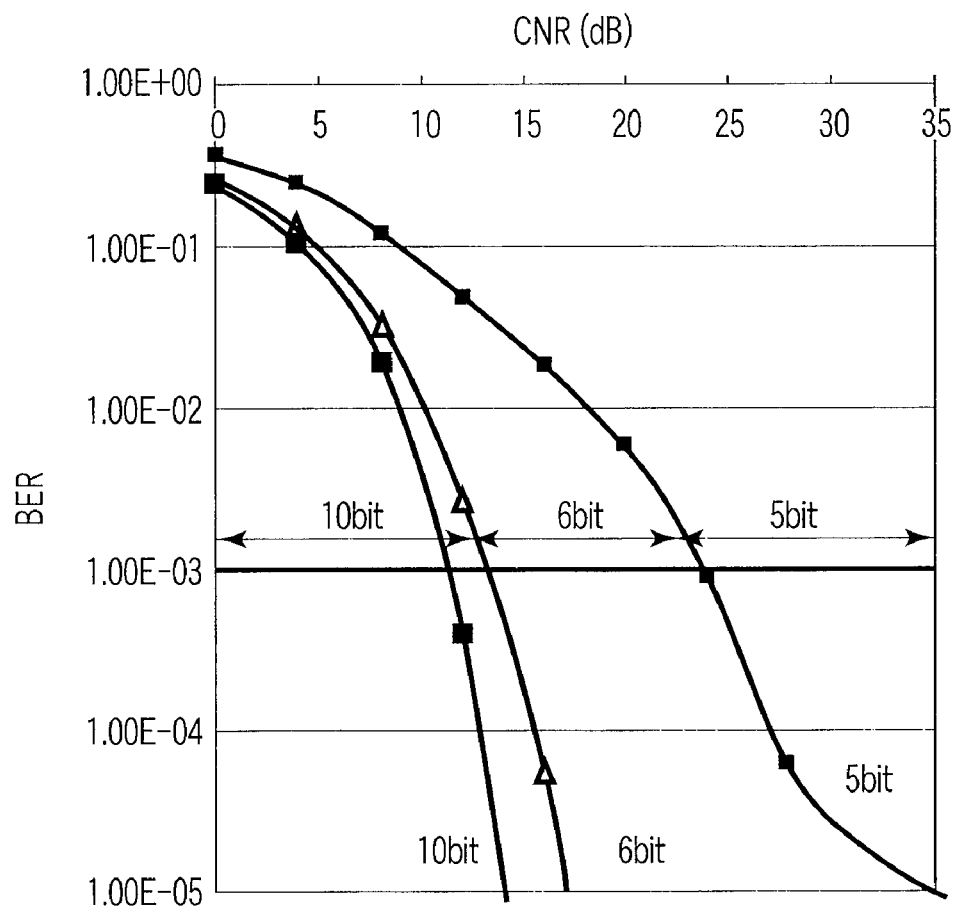
FIG. 7 is an exemplary view illustrating an allocation range of the shortest bit length satisfying a CNR versus BER characteristic and a preset quality (BER=$10^{-3}$) under an AWGN environment as for a description of a conventional technique.
FIG. 8 is an exemplary view illustrating a CNR versus bit length branch table created on the basis of the CNR versus BER characteristic illustrated in FIG. 7.

In terms of a packet transmission OFDM system for use in the wireless LAN, an outline of a bit-length changing method in which the EVM is used as the evaluation criterion is shown in FIG. 4. The method shown in FIG. 4 replaces the head of data symbol of a packet to a known search symbol for EVM calculation to transmit it on a transmission side. In FIG. 4, Wmax, W(t), and Ws(t) are bit lengths of a preamble, a search symbol and a data symbol applied to the arithmetical units 14A to 14C of the receiver, respectively. A receiving side calculates the EVM from the search symbol W(t) of an input packet to decide W(t+1) setting a bit length Ws(t) to apply to a data symbol immediately following the search symbol and a bit length of the next packet, based on the prescribed search rule.

FIG. 5 illustrates an example of a hit-length changing rule using the EVM evaluation criterion. In this example, the rule increases and decreases the bit length so that the preset quality becomes BER=10$^{-3}$. The branch value of the EVM is generated on the basis of the EVR versus BER characteristic shown in FIG. 3, and changing the branch value allows changing the preset quality. The bit length Ws(t) reflecting the EVM measured result measured in a packet, the bit length Ws(t) may be changed by following a communication characteristic even if the communication characteristic is rapidly varied for each packet.

When the technique disclosed in the Jpn. Pat. Appln. KOKAT Publication No. 2002-051016 is applied to the packet mode OFDM, a single bit length becomes to be applied to the whole of the packet, and the bit length cannot be changed dynamically. In contrast, the receiver of the configuration described above may selectively apply bit lengths independent from one another for the three of the preamble, search symbol, and data symbol inside the packet. Therefore, even when the communication situations for the packet of the last reception and for the currently receiving packet are extremely different form each other, the receiver regarding the invention may immediately respond to the situation by measuring the demodulation performance of the receiver in receiving the search symbol.

Having described about the hardware configuration shown in FIG. 1 herein, the whole or a part of the OFDM demodulator 14 may be achieved by software. FIG. 6 depicts the flow of the concrete processing for achieving the foregoing bit-length changing method by software.

In FIG. 6, an equation of W=Wmax is given as an initial condition. At first, the changing method determines a packet input (step S11), and when the packet input is made, the method discriminates a bit length Wmax after starting the reception of the preamble (step S12), discriminates the search symbol following the preamble to obtain its bit length W(t) (step S13), and conducts EVM calculation by the equation (1) (step S14). Next, the method decides the bit length Ws(t) for the data symbol following the search symbol, and decides the bit length W(t+1) for the search symbol of the next packet, based on the result of the EVM calculation (step S15). The method discriminates the data symbol depending on the bit length Ws(t) decided in this way (step S16). After this, the method repeatedly conducts the processing in the steps coming after the step S11. The proceeding of the processing like such a manner enables achieving the processing equivalent to that in the case of the hardware by means of the software.

The present invention is not limited to each of the aforementioned embodiments as they are, and in an implementation phase, this invention may be embodied in modifications of constituent elements without departing from the sprit or scope of the general inventive concept thereof. For instance, in the aforementioned embodiments, the present invention having been described in the case in which it is applied to the wireless LAN receiver of the QPSK-OFDM system, the invention is also applicable to, for example, a digital television broadcasting receiver employing a continuous mode OFDM system. This invention is also applicable to a BPSK-OFDM system, 16-QAM-OFDM system, 64-QAM-OFDM system, and the like as for its transmission system in a similar manner. Further, the invention is applicable not only to the OFDM system, but also applicable to, for example, a code division multiplex (CDM) system, or a time division multiplex (TDM) system in the like manner. Other than this, various types of the invention can be formed by appropriately combining a plurality of constituent elements. Some of the elements, for example, may be omitted from the whole of the constituent elements shown in the embodiments above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless receiver which is used for a digital signal transmission system to wirelessly transmit a digital signal by packetizing and modulating it, and selectively sets the shortest arithmetical bit length satisfying a required communication quality when performs demodulation arithmetical processing to demodulate the digital signal to be packet-transmitted, comprising:

an error vector magnitude (EVM) calculation unit configured to calculate an EVM value that is a measure indicating a difference form a known ideal result by inputting a demodulating arithmetical result by the arithmetical bit length; and an arithmetical bit length selection unit configured to predict a bit error rate by using the EVM value as an evaluation criterion and for selecting an arithmetical bit length by which the bit error rate becomes optimum, wherein the demodulating arithmetical processing is performed by the selected arithmetical bit length.

2. The receiver according to claim 1, when the head of a data symbol following a preamble of a packet is replaced for EVM calculation to a known search symbol on a transmission side, wherein the EVM calculation unit calculates an EVM value on the basis of the search symbol; and the arithmetical bit length selection unit decides a bit length to apply to a data symbol immediately following the search symbol and a bit length of the next packet from the EVM value calculated on the basis of the search symbol in accordance with a prescribed rule.

3. A demodulating method of a wireless receiver which is used for a digital signal transmission system wirelessly transmitting a digital signal by packetizing and modulating it, comprising:

demodulating the digital signal to be packetized and transmitted by a specified arithmetical bit length;

calculating an error vector magnitude (EVM) value that is a measure indicating a difference form a known ideal result by inputting a demodulating arithmetical result from the demodulating;

predicting a bit error rate by using the EVM value as an evaluation criterion and selecting an arithmetical bit length by which the bit error rate becomes optimum one; and specifying the selected arithmetical bit length to the demodulating.

4. The method according to claim 3, when the head of a data symbol following a preamble of a packet is replaced for EVM calculation to a known search symbol on a transmission side, wherein the calculating calculates an EVM value on the basis of the search symbol; and the selecting decides a bit length to apply to a data symbol immediately following the search symbol and a bit length of the next packet from the EVM value calculated on the basis of the search symbol in accordance with a prescribed rule.

* * * * *